(12) United States Patent
Kerin et al.

(10) Patent No.: US 7,866,711 B2
(45) Date of Patent: Jan. 11, 2011

(54) QUICK CONNECTOR WITH CONDUCTIVE PATH

(75) Inventors: Jim Kerin, Grosse Pointe Woods, MI (US); Richard M. Pepe, Macomb, MI (US)

(73) Assignee: TI Group Automotive Systems, LLC, Auburn Hills, MI (US)

( * ) Notice: Subject to any disclaimer, the term of this patent is extended or adjusted under 35 U.S.C. 154(b) by 400 days.

(21) Appl. No.: 11/841,506

(22) Filed: Aug. 20, 2007

(65) Prior Publication Data

US 2008/0048442 A1 Feb. 28, 2008

Related U.S. Application Data

(60) Provisional application No. 60/839,332, filed on Aug. 22, 2006.

(51) Int. Cl.
*F16L 37/00* (2006.01)
(52) U.S. Cl. .......................... 285/319; 285/308; 285/321
(58) Field of Classification Search .............. 285/325, 285/305, 319, 921, 308, 321; 411/522–524; 24/545, 546, 547, 563, 665, 658; 403/316, 403/317, 319
See application file for complete search history.

(56) References Cited

U.S. PATENT DOCUMENTS

| | | | |
|---|---|---|---|
| 2,108,759 A * | 2/1938 | Turman | 252/511 |
| 2,966,539 A * | 12/1960 | Sears et al. | 174/47 |
| 3,963,856 A * | 6/1976 | Carlson et al. | 174/47 |
| 4,111,197 A | 9/1978 | Warncke et al. | |
| 4,948,180 A * | 8/1990 | Usui et al. | 285/319 |
| 5,164,879 A * | 11/1992 | Danowski et al. | 361/215 |
| 5,311,408 A * | 5/1994 | Ferchau et al. | 361/818 |
| 5,468,027 A * | 11/1995 | Guest | 285/319 |
| 5,586,792 A | 12/1996 | Kalahasthy et al. | |
| 5,634,673 A * | 6/1997 | Miyazaki et al. | 285/921 |
| 5,792,990 A * | 8/1998 | Piero | 174/86 |
| 6,634,679 B1* | 10/2003 | Stieler | 285/308 |
| 6,805,383 B2 | 10/2004 | Ostrander et al. | |
| 2005/0218650 A1 | 10/2005 | Pepe et al. | |
| 2006/0103134 A1* | 5/2006 | Kerin | 285/305 |
| 2008/0160831 A1* | 7/2008 | Sprouse et al. | 439/608 |

\* cited by examiner

*Primary Examiner*—James M Hewitt
*Assistant Examiner*—Robert Williams
(74) *Attorney, Agent, or Firm*—Leydig, Voit & Mayer, Ltd.

(57) ABSTRACT

A quick connector coupling assembly comprising a conductive connector body, a tubular male member with an upset, and a primary retainer. The primary retainer releasably secures the male member within the connector body. The primary retainer body includes a pair of spaced legs connected by a cross member. The retainer body includes a conductive insert with contact surfaces exposed at the retainer legs to contact the male member and at the cross member to contact the connector body.

8 Claims, 3 Drawing Sheets

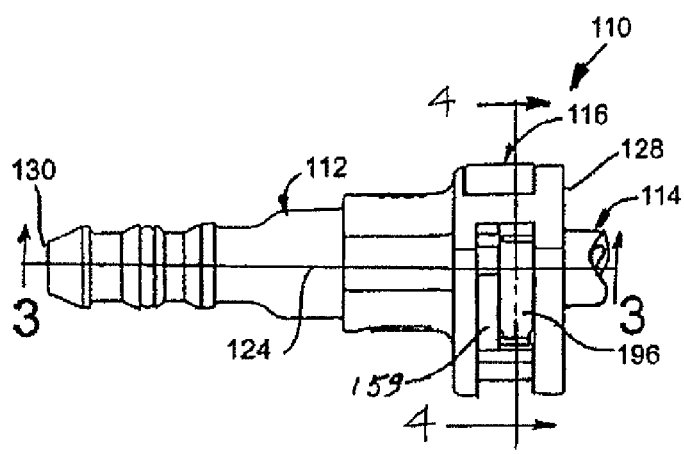
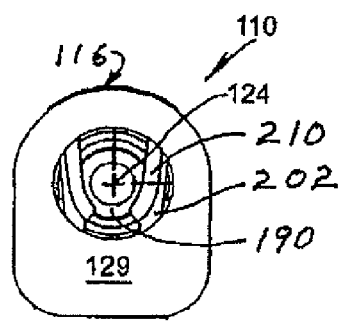
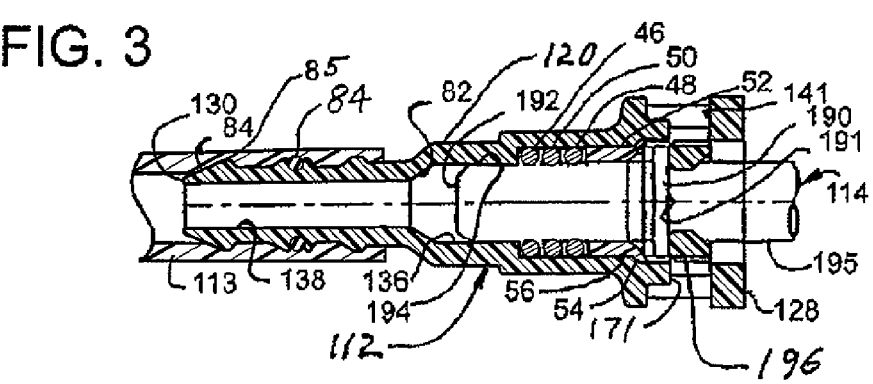
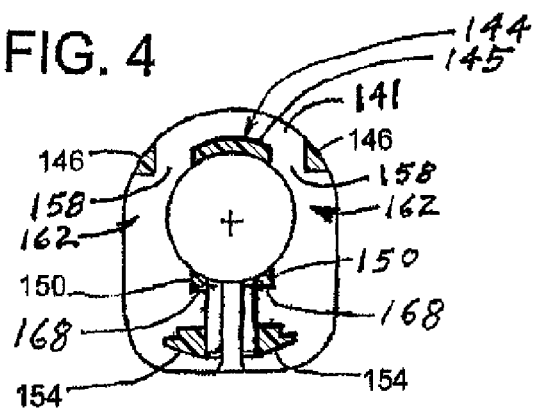

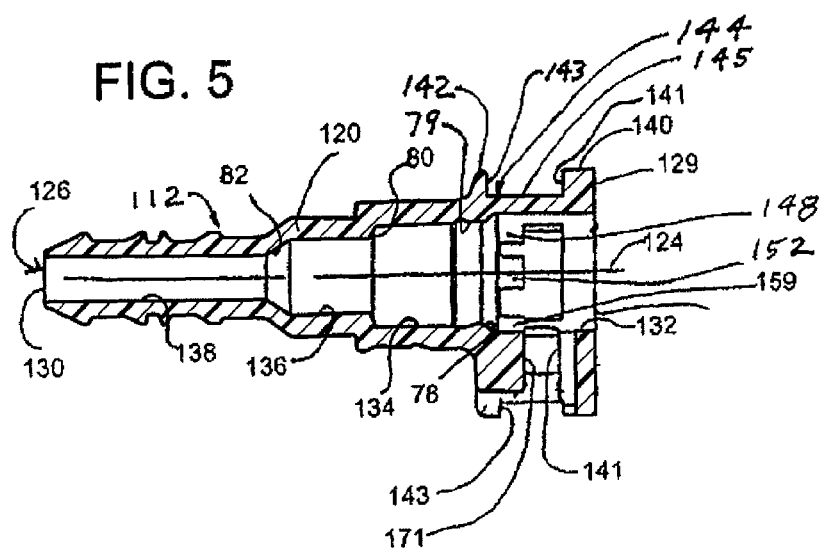
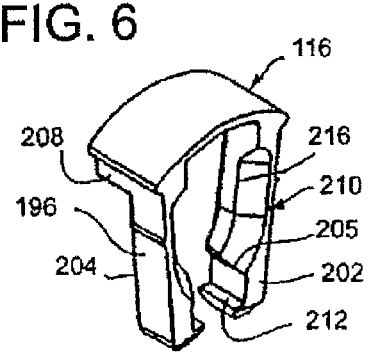
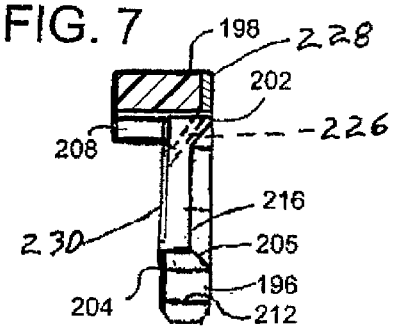
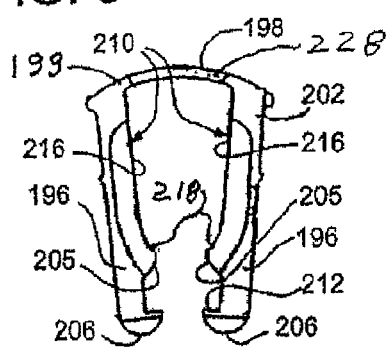
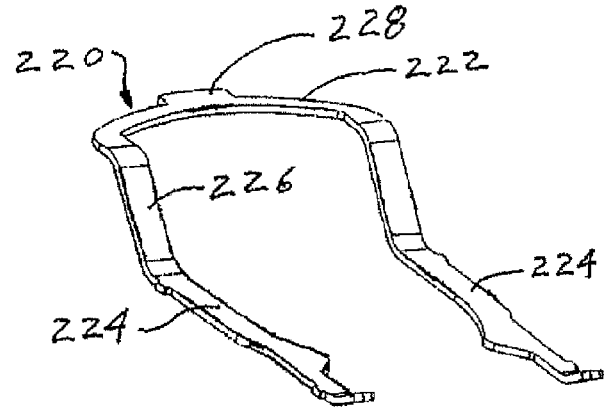

QUICK CONNECTOR WITH CONDUCTIVE PATH

This application claims priority pursuant to Title 35 United States Code, §119 to U.S. Provisional Application No. 60/839,332, filed Aug. 22, 2006.

BACKGROUND OF THE INVENTION

This invention relates to quick connector couplings for fluid systems, and more particularly to a quick connector coupling defining a conductive path for dissipation of electrostatic charge.

In automotive and other fields, quick connector couplings, which generally include a tubular male member received, and sealingly retained in a female connector body, are often utilized to form a fluid system. The coupling provides a fluid connection between two components or conduits, such as a flexible hose and a rigid tube, or a tube and a system component such as a manifold, fuel pump, fuel filter or the like.

One type of retention mechanism to releasably secure the tube to the connector coupling body is a retainer in the form of a clip inserted transversely through slots formed in the exterior of the connector body. Legs extend through the slots and are disposed between the male member upset and the forward surface of the connector body defining the slots, thereby preventing disconnection of the coupling.

Due to the physical appearance of such retainers, they are referred to as "horseshoe" retainers. The "horseshoe" retainer permits easy release of the coupling without significantly increasing the complexity of the coupling. An example of this type of retainer is found in U.S. Pat. No. 5,586,792, to Kalahasthy et al., the disclosure of which is incorporated herein by reference.

Advances in quick connectors with "horseshoe" retainers are disclosed in U.S. Publication No. 2005/0218650, published Oct. 6, 2005. The disclosure of that application is incorporated herein by reference.

Fluid systems, particularly vehicular fuel systems that contain flowing hydrocarbon fuel often include mechanisms to dissipate, or prevent accumulation of undesirable electrostatic charges. These mechanisms involve providing a path to ground to dissipate any charge that would otherwise accumulate. Toward this end, quick connector bodies are often made conductive. Such bodies may be made of a non-conductive material containing conductive material such as carbon powder, carbon fibers, fibers or metallic fibers. An example of a conductive component for fuel a system is found in U.S. Pat. No. 5,164,879, issued Nov. 17, 1992, entitled "Electrostatically Dissipative Fuel System Component." The disclosure of this patent is incorporated by reference.

Insuring a complete path to ground for dissipation of electrostatic charges is an important consideration in vehicular fuel system design. Because such fluid systems usually include a metal tube connected to the vehicle ground, it is desirable to ground the quick connector body to the vehicle ground through the metal tube of the system.

In quick connectors, such as disclosed in U.S. Pat. No. 5,586,792, the retainer releasably connects the connector body to the tube by virtue of its interposition between the radially enlarged upset formed near the end of the tube and a surface formed in the connector body.

The connector contains seals between the body and the tube to contain the fluid within the system. When pressurized, the fluid pressure urges the tube outward from the body. Outward movement is restrained by the retainer legs which are axially positioned rearward of the upset. The forces acting on the tube and the retainer urge it against a restraining surface on the connector body.

The present invention provides a retainer that includes a conductive element. That element is exposed for conductive contact with the tube upset and also the restraining surface on the conductive retainer body. Any electrostatic charge present within the fluid flow path of the connector body experiences a direct conductive path to the metal tube through the conductive element.

BRIEF DESCRIPTION OF THE DRAWINGS

FIG. 1 is a side view of a quick connector coupling assembly embodying the features of the present invention.

FIG. 2 is a front view of the quick connector coupling assembly of FIG. 1.

FIG. 3 is a sectional bottom view of the quick connector coupling assembly of FIG. 1 taken along line 3-3 of FIG. 1.

FIG. 4 is a sectional view of the connector body of FIG. 1, taken along line 4-4 of FIG. 1.

FIG. 5 is a side view, in section, of the connector body of the assembly of FIG. 1.

FIG. 6 is a perspective view of the primary retainer of the quick connector coupling assembly of FIG. 1.

FIG. 7 is a sectional side view of the primary retainer of FIG. 6.

FIG. 8 is a front view of the primary retainer of FIG. 6.

FIG. 9 is a perspective view of the conductive element of the retainer of the present invention.

DETAILED DESCRIPTION OF THE ILLUSTRATED EMBODIMENTS

Figure 10:
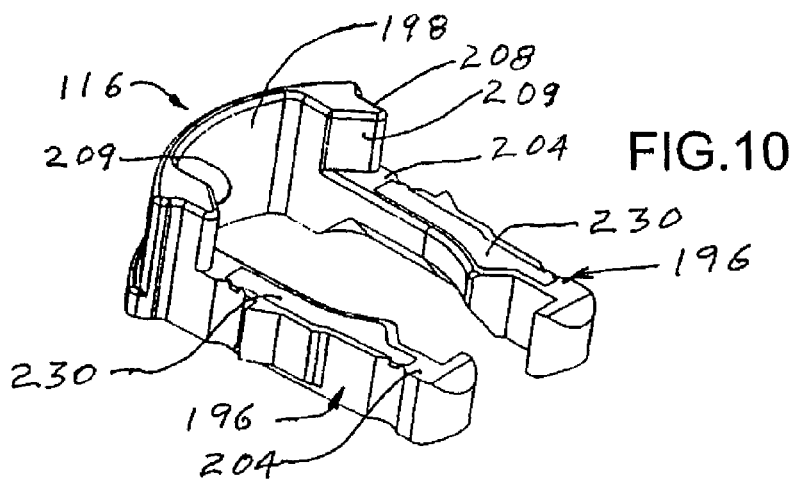
FIG. 10 is a rear perspective view of the retainer of the present invention.

The quick connector coupling of the present invention is illustrated in connection with a fluid line system. It is shown as a releasable connection between a rigid tube and another fluid carrying component, namely a flexible hose. However, the coupling has numerous other applications where a fluid tight, but releasable connection is desired, such as in an automotive vehicle fuel delivery system.

FIGS. 1-3 illustrate a quick connector coupling 110 for forming a severable connection in a fluid line. The coupling 110 is comprised of a generally cylindrical female connector body 112 and a rigid tube or male member 114, best seen in FIG. 3, releasably secured together by a conductive primary retainer member 116. Best seen in FIG. 3, the male member 114 is formed by the end of a hollow tube which forms a part of a fluid line system. In use, the female connector body 112 is connected to a tubing or hose which is also a part of the fluid line system. The female connector body 112 and the male member 114 are connected to form a permanent, but severable, joint in the fluid line.

As illustrated in FIG. 3, the male member 114 is formed at the end of a rigid tube. It includes a radially enlarged upset 190 defining a radial abutment surface 191 at a given distance from an open tube end or tip 192. A smooth generally cylindrical sealing surface 194, defined by the exterior surface of the tube, extends between the upset 190 and the tube end 192. The tube continues in a direction away from the tube end beyond upset 190 and defines a generally smooth cylindrical surface 195. It is generally the same diameter as the cylindrical sealing surface 194.

The connector body 112 is illustrated in detail in FIGS. 3-5. The illustrated connector body 112 is preferably molded of a plastic material, preferably polyphthalamide (PPA) rendered conductive by inclusion of conductive material such as carbon powder, carbon fibers, carbon fibers, or metal fibers. It must be understood that the body exterior may take any desired shape without departing from the invention. It could, for example, include a 90° bend between its ends, which is a common shape for a connector body.

The connector body 112 is defined by a generally cylindrical, stepped wall 120. The interior surface of wall 120 defines a through bore 126 centered about a longitudinal axis 124, as illustrated in FIG. 4. It should be noted that the term axial and axially as used herein means longitudinally along the central axis 124. The terms lateral, laterally, transverse and transversely mean in a plane generally perpendicular to the axis 124 toward and away from the axis.

The bore 126 of connector body 112 extends completely through the connector body 112, from a larger diameter, male member reception end 128 to a smaller diameter, hose connection end 130. Variations in the diameter of wall 120 of connector body 112 divide through bore 126 into distinct sections, a retainer housing section 132, a seal chamber 134, a tube end receptacle 136, and fluid passageway 138. It should be noted that the term forward is used herein to mean in a direction axially from male member reception end 128 toward the hose connection end 130 generally along the central axis 124. The term rearward means in a direction axially from the hose connection end 130 toward the male member reception end 128 generally along the central axis 124.

The retainer housing section 132 is adjacent to the male member reception end 128. It is defined by a rim 140 having a transverse planar entrance surface 129 that defines the opening to through bore 126 at the male reception end 128. Rim 140 defines a planar, forward facing retainer contact surface 141 best seem in FIG. 5. Forward rim 142 defines a rearward facing surface 143 separated from rim 140. The axial extent of the separation between forward facing retainer contact surface 141 of the rim 140 and rearward facing surface 143 of the forward rim 142 is such as to accommodate retainer 116.

Referring to FIG. 5, rims 140 and 142 are connected by an arcuate top support member 144, two side support members 146, two center support members 150, and two bottom support members 154.

The upper curved surface 145 of top support member 144 is somewhat recessed radially inward from the radially outward most edge of the rims 140 and 142. The upper curved surface 145 of top support member 144 and the surfaces 141 and 143 define a pocket that receives a cross member of the primary retainer 116 as will be discussed.

It should be noted that for purpose of clarity, the quick connector coupling 110 is shown with its longitudinal extent positioned in a horizontal plane and the terms "top," "bottom" and "sides" have been used in describing the connector body 116. However, in use, the connector coupling 110 can reside in any orientation without regard to the horizontal and vertical planes and "top" and "bottom" are only relevant to the illustrations herein.

The spaces between the top support member 144 and the two side support members 146 define a pair of first or top slots 158. The spaces between the two side support members 146 and bottom support members 154 define a pair of side slots 162. The slots 158 and 162 are open to the through bore 126.

The top slots 158 receive and position legs of the primary retainer 116 transversely to the central axis 124 of the connector body 112. The leg elements of the primary retainer 116 reside in side slots 162 as will be discussed.

As best seen in FIGS. 4 and 5, the rearward facing surface 143 of the forward rim 142 of the connector body 112 includes a rearward axial protrusions or body posts 148, 152, and 159, extending partially toward the rim 140. These protrusions or body posts are integrally molded into the connector body. Upper body posts 148 are disposed at the lateral ends of curved top wall 144. These upper body posts 148 each include a top curved surface that cooperates with camming surfaces on the retainer cross member in a well-known maimer and as will be discussed.

Bottom protrusion or plateau 159 is a solid portion of the body 112 that defines a planar surface 171, best seen in FIG. 4, that faces rearward toward the forward facing retainer contact surface 141 of the rim 140. The spacing between planar surface 141 and surface 171 is sized to receive the legs of retainer 116.

Each of the center support members 150 defines a locking shoulder 168, best seen in FIG. 5. It will coact with the primary retainer 116 as will be discussed.

As seen in FIG. 4, the seal chamber 134 is formed axially forward of the retainer housing section 132. It is defined by a reduced diameter portion of wall 120, relative to the retainer housing section 132. It extends axially forward from a conical shoulder 78 to a radial shoulder 80. An annular recess 79 is provided in wall 120 axially forward of the shoulder 78. The seal chamber 134 is provided to house sealing elements to form a fluid seal between the connector body 112 and the male member 114.

As illustrated in FIG. 3, two O-ring seals 46 and 48 separated by a rigid spacer ring 50 are disposed radially in between the male member 134 and the inner surface of wall 120 at seal chamber 134. The O-rings 46 and 48 are sized to fit tightly within the seal chamber 134 and tightly around the sealing surface 194 of the male member 114. The O-rings 46 and 48 are secured in the seal chamber 134 by a hollow spacer sleeve 52. The spacer sleeve 52 has a conically enlarged end 54 which seats against the conical shoulder 78 of wall 120 to position the sleeve 52 within bore 126. To provide enhanced securement of the spacer sleeve 52 within the bore 126, a raised annular portion 56 is formed in the outer periphery of sleeve 52. The raised portion 56 is matingly received in the recess 79 formed in the wall 120 to lock the sleeve 52 in place.

The tube end receptacle 136 is formed axially forward of the seal chamber 134. It is defined by a reduced diameter portion of wall 120, relative to seal chamber 134, which extends axially forward from the small diameter end of radial shoulder 80 to a conical shoulder 82. The tube end receptacle 136 is sized to receive, and pilot or guide the male member 114 cylindrical sealing surface 194.

The fluid passageway 138 is defined by the smallest diameter portion of wall 120. It leads from the small diameter end of conical shoulder 82 to the hose connection end 130. The portion of wall 120 surrounding fluid passageway 138 is configured to facilitate connection to another component in the fluid line. The illustrated connector body 112, for example, is specially formed for connection to flexible hose 113 and includes radial barbs 85 and a groove housing an O-ring seal 84 to seal against the interior of hose 113. Of course, as previously discussed, any other suitable connection arrangement can be used to complete a fluid system.

The primary "horse-shoe" type retainer 116 is illustrated in detail in FIGS. 6-11. It has a body preferably molded of a resilient, flexible material, such as polyphthalamide (PPA). The retainer body is rendered conductive by conductive insert 220 as will be discussed.

The primary retainer 116 includes a pair of elongated, generally parallel legs 196 extending from, and joined at one end by a cross member 198. The normal separation between the legs 196 is approximately equal to the outer diameter of the cylindrical sealing surface 194 of male member 114. Legs 196 include rearward faces 202 and forward faces 204.

The conductive primary retainer 116, is disposed in retainer housing section 132. It extends transversely through the top slots 158 of retainer housing section 132, and is removably coupled to the connector body 112. As seen in FIG. 1, legs 196 of retainer 116 are disposed between forward facing surface 141 of the front rim 140 and the planar surface 171 formed on the bottom protrusion 159. This space is axially greater than the axial thickness of the legs 196.

Release protrusions 208 are formed on the radially inner surface of cross member 198. The release protrusions 208 define ramped or camming surfaces 209 that coact with upper body posts 148 to support the central area of cross member 196 in spaced relation to upper surface 145 of top support member 144.

As seen in FIG. 7, rearward facing surface 199 of cross member 198 is axially aligned with rearward faces 202 of the legs 196. The surfaces 199 and 202 define a planar body contacting surface for abutting contact with the planar forward facing retainer contact surface 141. The cross member extends axially beyond the forward faces 204 of the legs 196 and is sized to fit within the pocket between surfaces 141 and 143 above upper surface 145 of top support member 144.

Each leg 196 includes a latch 206 formed at an end remote from the cross member 198. When the primary retainer 116 is fully inserted into the connector body 112, the latches 206 lock the primary retainer 116 into position relative to the connector body 112. Latching edges 212, defined by the latches 206, engage the locking shoulders 168, defined by the center support members 150 of the connector body 112, to releasably lock the primary retainer 116 in place.

Each leg 196 includes an angled surface 205 seen in FIGS. 7 and 8 that coacts with upper lateral outward edges of center support members 150 to urge the primary retainer upward. The resilient property of the legs 196 assures this relationship. Each upward movement is restricted by the contact of latching edges 212 with locking shoulders 168 on center support members 150.

Lead areas 210 are formed into the rearward faces 202 of legs 196. These areas 210 slope radially inward and axially forward from the rearward face 202 of each leg, and terminate approximately midway between the rearward face 202 and the forward face 204 of each leg. The spacing between the lead edges of lead areas 210 is at its greatest adjacent the rearward face 202.

The spacing is approximately equal to the outer diameter or outer perimeter surface of the upset 190 formed on the male member 114. At the inner edges 216 of the lead areas 210, the spacing between the lead areas 210 is approximately equal to the outer diameter of the sealing surface 194 of the male member 114. The portions of the lead areas 210 closer to the latches 206 curve inwardly at 218 to match the annular profile of the male member upset 190. This shape assists in guidance and centering of the male member 114 in the connector body 112 during insertion of the tube into the connector body.

Connection of a male member 114 to connector body 112 is accomplished by insertion of tube end 192 through the entrance opening at the male reception end 128 and urging the tube end forward into the bore 126. The tube end 192 passes through the "seal pack" comprising the O-ring seals 46 and 48 and spacer 50 and into tube end receptacle 136 where it is piloted by the wall 120 of the connector body.

The tube is urged forward until the upset 190 contacts the curved portions 218 of lead areas 210 formed on the rearward faces 202 of legs 196. Continued insertion of the tube causes the upset 190 to engage the lead areas 210 and urge the legs laterally apart. The legs 196 are sufficiently flexible to spread sufficiently to permit the upset to pass inwardly beyond the forward faces 204 of the legs. Once the upset 190 is forward of the forward faces of legs 196, the resilient nature of the legs causes them to return to their normal spacing adjacent the cylindrical surface 195 of the tube. The upset is then in abutting contact with the forward faces 204 of the legs 196. The reward faces 202 of the legs 196 and rearward facing surface 199 of cross member 198 abut the forward facing planar retainer contact surface 141 to prevent withdrawal of the male member 114.

With the primary retainer 116 in the locked position, the forward faces 204 of the legs 196 abut the abutment surface 191 of upset 190. The rearward faces 202 abut the planar surface 141 of rim 140 to prevent withdrawal of the male member 114 from the connector body 112. Axial forces urging the upset outward of opening 127 are resisted by contact of the rear surfaces 204 of legs 196 of retainer 116 with forward facing surface 141. The rearward facing surface 199 of cross member 198 is also in abutting contact with surface 141.

The ramp surfaces of the release protrusions 208 rest on the top curved surfaces of upper body posts 145. Inward radial pressure applied to the center of cross member 198 urges the cross member toward the upper surface 145 of top support member 144, and causes the legs 196 to spread apart, with the latches 206 moving transversely outward within side slots 162. This action permits release of the male member 114 should withdrawal of the male member from the connector body 112 be desired.

In accordance with the present invention the body of retainer 116 is rendered conductive by the employment of a conductive metallic insert 220 shown in FIG. 9. It is a unitary element made of a steel stamping.

Best seen in FIG. 9, the insert 220 includes a cross member 222 and spaced legs 224. These portions are connected by transverse links 226.

Cross member 222 defines connector body contact surface 228. Legs 224 define tube upset contact surfaces 230. Since the insert is unitary, and metallic, it defines a conductive path between the contact surfaces 228 and 230.

Figure 11:
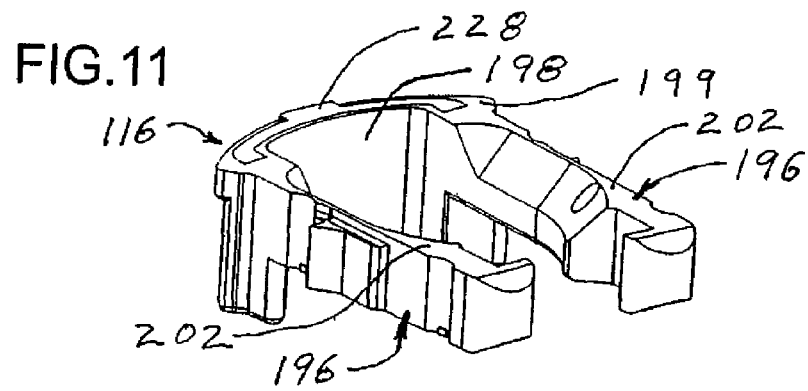
FIG. 11 is a front perspective view of the retainer of the present invention.

The conductive retainer 116 is shown in detail in FIGS. 10 and 11. FIG. 10 shows the forward faces 204 of legs 196 and FIG. 11 shows the rearward faces 202 of legs 196 and also rearward facing surface 199 of cross member 198 which is coplanar with the rear faces 202 of legs 202. The spacing of legs 224 is less than the diameter of upset 190 on male member 114. This assures that the contact surfaces 230 of metallic insert 220 will contact the radial abutment surface 191 of upset 190.

As seen in FIG. 10, the upset contact surfaces 230 are exposed at the forward faces 204 of legs 196. As seen in FIG. 11, the body contact surface 230 overlies the rearward facing surface 199 of cross member 198. It is thereby exposed at the rearward facing surface 199 of cross member 198.

With the conductive retainer 196 in place in connector body 112 and a male member 114 secured in the body by the retainer 116, a conductive path is defined by insert 220 from tube upset 190 to forward facing retainer contact surface 141 of connector body 112.

Fluid pressure within the fluid system urges the tube end 192 outward of the connector body 112. The radial abutment surface 191 of tube upset 190 contacts the tube upset contact surfaces 230 of insert 220 exposed at the forward faces 204 of legs 196. These same forces urge the retainer toward the surface 141 of body 112. The body contact surface 228 of insert 220 is urged into abutting contact with the forward facing retainer contact surface 141 of connector body 112. A conductive path is thus provided through the retainer from the connector body 112 to the tube upset 190.

The conductive retainer is preferably formed by insert molding the metallic insert 220 into the retainer body. Inserts 220, in multiple rows are stamped from a metallic strip. These stamped elements are fed into a mold having a plurality of cavities, one per cavity. The inserts are supported in the mold and the polyphthalamide resin delivered to the mold cavities and cured to form complete retainers with the conductive path extending from the forward faces 204 of the legs to the rearward face 199 of cross member 198.

Figure 12:
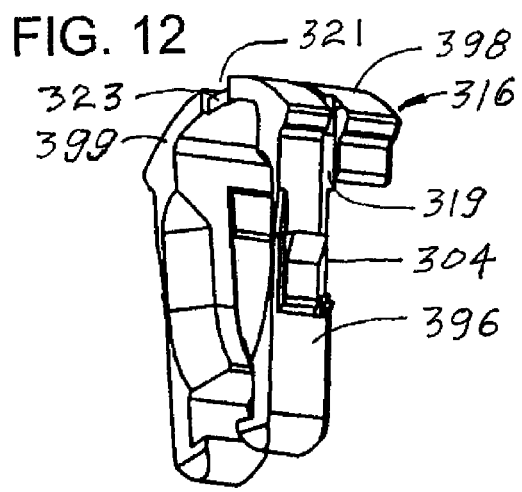
FIG. 12 is a perspective view of an alternate form of retainer component embodying the present invention.
Figure 13:
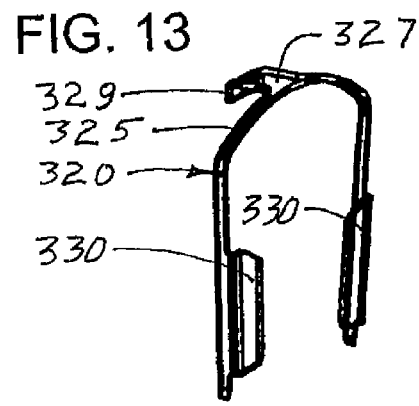
FIG. 13 is a perspective view of a conductive element for the retainer body of FIG. 12.

FIGS. 12 and 13 illustrate another option for providing a conductive path in the retainer. Here a conductive retainer 316 includes two elements, a body 317 and a conductive insert 320. Rather than insert molding, however, this retainer is made of two separate components assembled together.

Retainer body 317 is molded of plastic resin such as polyphthalamide. It includes legs 396 and a cross member 398 shaped as is the retainer 116 of the previous embodiment. That is, it includes all of the surfaces and features of the retainer 116 necessary to operate to releasably retain a male member 114 within a connector body 112.

The retainer body 317 includes slots 319 formed in cross member 398 aligned with forward facing surfaces 304 of legs 396.

Cross member 398 also includes an axial slot 321 along its top surface that extends to the slots 319. The rearward facing surface 399 of cross member 398 includes a notch 323 that connects with slot 321.

A metallic conductive attachment 320 is shown in FIG. 13. It includes a generally "U" shaped band 325 which defines a cross member and a pair of spaced parallel legs. The band is sized to fit within slots 319.

Each leg of the band includes a contact pad 330. It also includes an axial web 327 that extends from the central portion of the band 325. The web terminates in a contact flange 329.

The conductive retainer 316 is created by assembling the conductive insert 320 onto the retainer body 317. The band is disposed in the slots 319 of the cross member 398. The web 327 is disposed in axial slot 321 with contact flange 329 disposed in notch 323. Contact pads 330 are disposed adjacent forward faces 304 of legs 396.

The metallic insert 320 is configured to attach to the retainer body 317 by spring action of the insert. In this regard, the contact flange grips the retainer body within notch 323 and the contact pads grip the outer surfaces of legs 396.

With the assembled retainer 316 installed into a connector coupling, the contact pads 330 are disposed adjacent the upset 190 of male member 114 and are in abutting contact with radial abutment surface 191. The contact flange 329 is in abutting contact with the forward facing retainer contact surface 141 of connector body 112. Since the connector body is conductive, a conductive path is provided by the insert 320 between the connector body 116 and the upset 190 of the rigid tube 114.

Various features of the present invention have been explained with reference to the embodiments shown and described. It must be understood that numerous modifications may be made without departing from the spirit and scope of the invention as defined by the appended claims.

The invention claimed is:

1. A quick connector coupling for forming a severable connection in a fluid line comprising:
   a conductive connector body defining a through bore extending axially forward from a male reception end of said connector body and having a forward facing retainer contact surface;
   a conductive tubular male member extending through said male reception end of said connector body and into said bore, said male member having a generally cylindrical sealing surface and an annular upset, said upset having a diameter greater than the diameter of said cylindrical surface and defining a rearward facing radial abutment surface;
   a tube retainer within said connector body including a non-conductive body having spaced apart legs, each having non-conductive forward facing and rearward facing surfaces;
   a cross member connecting said legs and having a non-conductive rearward facing surface,
      said retainer including a separate conductive insert in said retainer non-conductive body comprising at least one leg having a conductive tube upset contact surface on said non-conductive forward facing surface of at least one of said legs contacting said rearward facing radial abutment surface of said upset of said conductive tubular male member, and a cross member having a conductive connector body contact surface on said non-conductive rearward facing surface of said cross member of said non-conductive tube retainer contacting said forward facing retainer contact surface of said conductive connector body.

2. A quick connector coupling as claimed in claim 1, wherein said conductive insert is a metal insert.

3. A quick connector coupling as claimed in claim 2, wherein said conductive insert includes two legs, each defining a conductive tube upset contact surface at said non-conductive forward facing surface of each one of said legs.

4. A quick connector coupling as claimed in claim 3, wherein said conductive insert includes conductive transition portions connecting said legs of said insert and said cross member of said insert.

5. A quick connector coupling as claimed in claim 4, wherein said conductive insert is a unitary metal component.

6. A quick connector coupling as claimed in claim 5, wherein said retainer body is made from polyphthalamide.

7. A quick connector coupling as claimed in claim 6, wherein said conductive insert is made from steel.

8. A quick connector coupling as claimed in claim 7, wherein said retainer is made by insert molding said conductive insert into the retainer body.

* * * * *